United States Patent
Nodder

(10) Patent No.: US 11,792,175 B1
(45) Date of Patent: Oct. 17, 2023

(54) SECURITY SYSTEM WITH DYNAMIC INSURANCE INTEGRATION

(71) Applicant: Alarm.com Incorporated, Tysons, VA (US)

(72) Inventor: Stephen Nodder, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 415 days.

(21) Appl. No.: 16/927,320

(22) Filed: Jul. 13, 2020

Related U.S. Application Data

(60) Provisional application No. 62/872,791, filed on Jul. 11, 2019.

(51) Int. Cl.
*H04L 9/40* (2022.01)
*H04L 67/53* (2022.01)

(52) U.S. Cl.
CPC .......... *H04L 63/08* (2013.01); *H04L 63/1433* (2013.01); *H04L 67/53* (2022.05)

(58) Field of Classification Search
CPC ...... H04L 63/08; H04L 63/1433; H04L 67/53
USPC .......................................................... 726/7
See application file for complete search history.

(56) References Cited

U.S. PATENT DOCUMENTS

| | | | |
|---|---|---|---|
| 8,510,133 B2 | 8/2013 | Peak et al. | |
| 8,819,773 B2* | 8/2014 | Banzhof | H04L 63/145 |
| | | | 713/188 |
| 9,692,742 B1* | 6/2017 | VanLund | H04L 67/1097 |
| 10,061,936 B1* | 8/2018 | Burger | H04L 63/1441 |
| 10,997,662 B1* | 5/2021 | Warfel | G06Q 30/0269 |
| 11,102,244 B1* | 8/2021 | Jakobsson | H04L 51/42 |
| 2008/0065427 A1* | 3/2008 | Helitzer | G16Z 99/00 |
| | | | 705/4 |
| 2011/0161100 A1* | 6/2011 | Peak | G01C 21/36 |
| | | | 705/2 |
| 2013/0204645 A1 | 8/2013 | Lehman et al. | |
| 2017/0279787 A1* | 9/2017 | Cheng | H04L 63/10 |
| 2017/0289134 A1* | 10/2017 | Bradley | H04L 63/105 |
| 2018/0219846 A1* | 8/2018 | Poschel | H04L 63/0807 |
| 2019/0124134 A1* | 4/2019 | Chmielewski | H04L 12/2809 |
| 2019/0327260 A1* | 10/2019 | Adamson | H04L 63/1433 |
| 2020/0275266 A1* | 8/2020 | Jakobsson | H04W 4/90 |
| 2020/0311298 A1* | 10/2020 | Dunjic | H04L 63/1433 |
| 2020/0387624 A1* | 12/2020 | Dunjic | G06F 21/552 |
| 2021/0352097 A1* | 11/2021 | Vlahovic | G06Q 30/0185 |

\* cited by examiner

*Primary Examiner* — Dant B Shaifer Harriman
(74) *Attorney, Agent, or Firm* — Fish & Richardson P.C.

(57) ABSTRACT

Methods, systems, and apparatus, including computer programs encoded on a computer storage medium, for a security system with dynamic insurance integration. In some implementations, a security token is generated in response to a user requesting a risk assessment. The security token is provided to a third-party server. A request from the third-party server for monitoring data collected by a security system associated with the user is received. Monitoring data is provided to the third-party server. An indication of the risk assessment from the third-party server is received.

20 Claims, 7 Drawing Sheets

SECURITY SYSTEM WITH DYNAMIC INSURANCE INTEGRATION

CROSS-REFERENCE TO RELATED APPLICATION

This application claims the benefit of U.S. Provisional Application No. 62/872,791, filed Jul. 11, 2019, and titled "SECURITY SYSTEM WITH DYNAMIC INSURANCE INTEGRATION," which is incorporated by reference.

TECHNICAL FIELD

This description generally relates to security monitoring.

BACKGROUND

Homes may have a security system that includes various sensors. A resident of a home without a security system may choose to have one installed, thereby increasing the safety afforded to the home's occupants.

SUMMARY

In some implementations, a monitoring system of a security system is integrated with an insurance provider system such that coverage information and utilization information associated with the customer are provided to the insurance provider system in response to a request by the customer. The coverage information and the utilization information may include information regarding the customer's existing security system, planned changes to an existing security system, and/or a planned installation of a security system. In response to receiving the customer information, the insurance provider system provides the customer one or more insurance quotes indicating a cost of a new insurance policy, an amount in savings to an existing policy the customer has, and/or an amount in savings for a new insurance policy. Where the customer information indicates a planned change to an existing security system and/or a planned installation of a security system, the one or more insurance quotes may detail the savings or policy cost contribution provided by each of the security sub-systems and/or devices included in the planned changes and/or the planned security system.

In some implementations, the monitoring system provides the customer data to multiple insurance provider systems, each associated with an insurance provider. The insurance providers may be selected by the customer. In these implementations, each of the insurance provider systems may provide the customer one or more quotes.

In some implementations, a customer requests the one or more quotes from the insurance provider system. The request may be first provided to a security system. In response to receiving the request, the security system may generate a security token. The security token may be provided to the customer and to the insurance provider system. Using the security token, the insurance provider system may obtain customer information from the monitoring system. The security token may allow the insurance provider system to continually or periodically obtain customer information.

In some implementations, the customer information includes a coverage score and a utilization score.

In some implementations, the customer information includes an overall risk score.

In some implementations, the customer information includes coverage information and utilization information. Coverage information may include the security systems, security sub-systems, security devices, and security software that a customer currently has installed or has implemented, and/or the planned security systems, security sub-systems, security devices, and security software that a customer plans to have installed. Utilization information may include a customer's usage data of their existing security system(s), including, for example, usage of specific security sub-systems, security devices within the security system(s), and/or security software that is part of the security system(s).

In some implementations, when a connection between the customer and the insurance provider system is established (e.g., when the insurance provider receives the security token), information may be passed from the monitoring system to the insurance provider system on a regular cadence to dynamically update utilization scores, coverage scores, and/or overall risk scores for the customer.

In some implementations, a customer is presented an interface. Through this interface the customer can select one or more insurance providers to request quotes from. Through this interface the customer can select one or more security packages. Through this interface the customer can select one or more pieces of equipment and/or one or more sensors in order to generate a customized security package. Through this interface the customer may receive one or more quotes indicating a cost of a new insurance policy, an amount in savings to an existing policy the customer has, and/or an amount in savings for a new insurance policy.

In one general aspect, a method includes: generating a security token at a computing device in response to a user requesting a risk assessment; providing the security token to a third-party server that is remote with respect to the computing device; receiving, from the third-party server, a request for monitoring data collected by a security system associated with the user; providing the monitoring data to the third-party server; and receiving an indication of the risk assessment from the third-party server, the risk assessment having been performed at the third-party server using the monitoring data.

Implementations, may include one or more of the following features. For example, in some implementations, receiving the request for the monitoring data includes receiving, from the third-party server, a request that includes the security token.

In some implementations, providing monitoring data to the third-party server includes providing an indication of coverage data associated with the user and an indication of utilization data associated with the user to the third-party server.

In some implementations, providing an indication of coverage data associated with the user includes providing, to the third-party server, an indication of at least one of the following: a number of sensors, devices, or systems of the security system associated with the user; types of sensors, devices, or systems of the security system associated with the user; models of sensors, devices, or systems of the security system associated with the user; manufacturers of sensors, devices, or systems of the security system associated with the user; age of sensors, devices, or systems of the security system associated with the user; accuracy of sensors, devices, or systems of the security system associated with the user; and reliability of sensors, devices, or systems of the security system associated with the user.

In some implementations, providing an indication of utilization data associated with the user includes providing, to the system, an indication of at least one of the following: utilization of at least one sensor associated with the user;

utilization of at least one device associated with the user; and utilization of at least one system associated with the user.

In some implementations, providing the indication of the utilization of the at least one sensor includes providing, to the third-party server, an indication of at least one of the following: frequency that the at least one sensor is in an on-state; frequency that the at least one sensor is collecting sensor data; and frequency that the at least one sensor is synched with the security system associated with the user.

In some implementations, providing the indication of the utilization of the at least one device includes providing, to the third-party server, an indication of at least one of the following: frequency that the user interacts with the at least one device of the security system associated with the user; frequency that the at least one device is in an on-state such that the at least one device can receive sensor data from one or more sensors of the security system associated with the user or send notifications to the user; and frequency that the user uses the at least one device to arm one or more systems of the security system associated with the user.

In some implementations, providing the indication of the utilization of the at least one system includes providing, to the third-party server, an indication of at least one of the following: frequency that the at least one system is in an armed state; frequency that the user reviews security reports generated by the at least one system; frequency that the user interacts with the at least one system; frequency that the user performs an action suggested by the at least one system; response times of the user to acknowledge security events detected by the at least one system; and response times of the user to perform an action suggested by the at least one system.

In some implementations, the method includes: generating a coverage score from the coverage data; and generating a utilization score from the utilization data.

In some implementations, generating a coverage score from the coverage data includes: calculating feature scores for different characteristics of the security system, where the different characteristics of the security system includes at least one of the following: individual sensors, devices, or systems that can optionally be included in the security system, or groupings of sensors, devices, or systems that can optionally be included in the security system; and calculating the coverage score using the features scores.

In some implementations, the method includes: receiving, from the third-party server, an indication of the weights to apply to the feature scores for different characteristics of the security system; and applying the weights to the feature scores to generate weighted features scores, where calculating the coverage score using the features scores includes calculating the coverage score using the weighted features scores.

In some implementations, the method includes generating a risk score from the coverage score and the utilization score, where providing monitoring data associated with the user includes providing the risk score to the third-party server.

In some implementations, generating the risk score from the coverage score and the utilization score includes: averaging the coverage score and the utilization score; applying a first weight to the coverage score and a second weight to the utilization score that is different than the first weight, and averaging the weighted coverage score and the weighted utilization score; multiplying the coverage score by the utilization score; or applying a first weight to the coverage score and a second weight to the utilization score that is different than the first weight, and multiplying the weighted coverage score by the weighted utilization score.

In some implementations, the method includes collecting sensor data using one or more sensors or devices, where providing the monitoring data to the third-party server includes providing, to the third-party server, the sensor data or data generated from the sensor data.

In another general aspect, a method includes: receiving, at a server, a security token from a computing device that is remote with respect to the server; sending, to the computing device, a request for monitoring data associated with a user of the computing device; receiving, from the computing device, monitoring data; performing a risk assessment using the monitoring data; and providing an indication of the risk assessment to the computing device.

Implementations, may include one or more of the following features. For example, in some implementations, performing the risk assessment includes generating a risk score from the monitoring data.

In some implementations, performing the risk assessment includes: determining an initial risk score for the user from the monitoring data, where the initial risk score is based on a coverage score corresponding to the user and a utilization score corresponding to the user; accessing at least one of monitoring data corresponding to one or more other users or risk assessments previously performed for the one or more other users; and determining a risk score for the user by adjusting the initial risk score based on at least one of the monitoring data corresponding to the one or more other users or risk assessments previously performed for the one or more other users.

In some implementations, determining the risk score for the user by adjusting the initial risk score includes: determining the risk score by increasing the initial risk score based on at least one of a determination that the coverage score corresponding to the user is greater than one or more previously determined coverage scores corresponding to the one or more other users, a determination that the utilization score corresponding to the user is greater than one or more previously determined coverage scores corresponding to the one or more other users, and a determination that the initial risk score for the user is greater than one or more previously determined initial risk scores for the one or more other users; or determining the risk score by decreasing the initial risk score based on at least one of a determination that the coverage score corresponding to the user is less than one or more previously determined coverage scores corresponding to the one or more other users, a determination that the utilization score corresponding to the user is less than one or more previously determined coverage scores corresponding to the one or more other users, and a determination that the initial risk score for the user is less than one or more previously determined initial risk scores for the one or more other users.

In some implementations, accessing at least one of the monitoring data corresponding to the one or more other users or the risk assessments previously performed for the one or more other users includes accessing at least one of the following: monitoring data corresponding to one or more other users that correspond to a locality that corresponds to the user, or risk assessments previously performed for one or more other users that correspond to a locality that corresponds to the user.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Many residents equip their homes with security monitoring systems that include one or more sensors and controls for monitoring the resident's property. For example, the monitoring system may include cameras that capture activity within a room or at an access point (e.g., at a door), motion detectors that sense movement within an area of the property, door and window sensors (e.g., to detect whether a door or window is open and/or broken), sensors on utilities (e.g., to detect water usage), or environmental controls (e.g., thermostat settings). In some cases, the monitoring system may include controlled-access entry points that require user-authentication for passage, for example, a door equipped with a keypad requiring a user-specific code for entry. Such monitoring systems are not limited to homes and may be installed in a variety of properties, including commercial buildings as well as other residential buildings (e.g., apartments, condos, etc.).

Figure 1A:
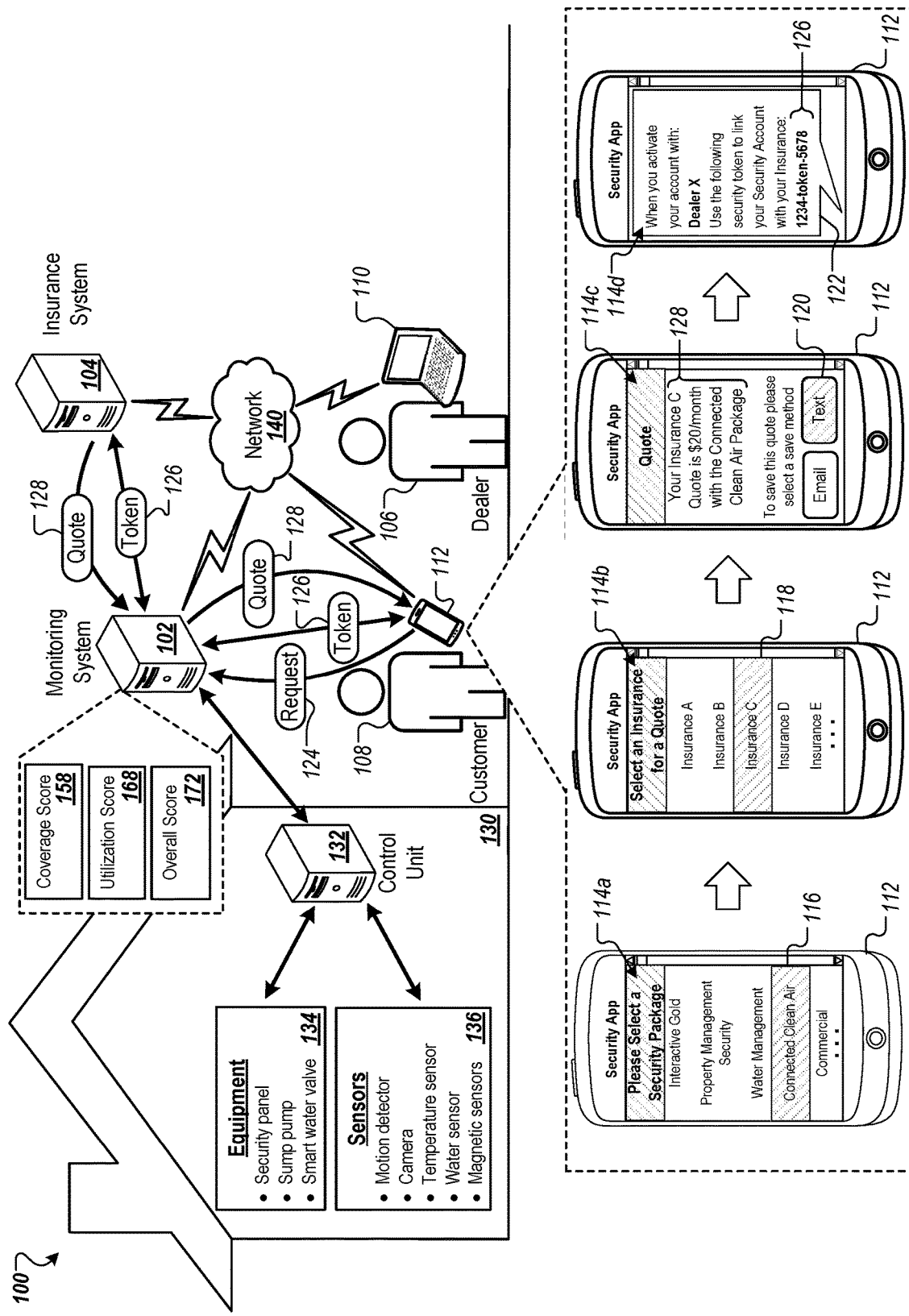
FIGS. 1A-B are diagrams that illustrates an example security system with dynamic insurance integration.

FIG. 1A shows an example security system 100 with dynamic insurance integration. The security system 100 includes a monitoring system 102, a control unit 132, equipment 134, and sensors 136. The security system 100 is able to communicate with an insurance system 104. All or part of the security system 100 is installed in a property 130. The property 130 may be a house, an apartment, a condominium, a different type of residential unit or building, an office building, an office space, or a different type of commercial unit or building. By integrating the insurance system 104 with the security system 100, the security system 100 is able to provide the insurance system 104 information associated with a customer 108 and is able to proximately receive, from the insurance system 104, an insurance quote which can be provided to the customer 108.

The control unit 132 may include one or more computing devices. The control unit 132 may communicate with equipment 134 and sensors 136 through a wired or wireless connection. In implementations where the control unit 132 communicates with equipment 134 and sensors 136 through a wireless connection, the communication may take place over the network 140. The control unit 132 may receive equipment and sensor output information from the equipment 134 and the sensors 136. The control unit 132 may communicate with the monitoring system 102 over the network 140.

The sensors 136 may include, for example, one or more visible-light cameras, infrared-light cameras (IR cameras), magnetic sensors (e.g., that are installed on one or more doors and/or windows), motion detectors, temperature sensors, and/or water sensors. Each of the sensors 136 may be considered a security device. One or more of the sensors of the sensors 136 may belong to particular security sub-systems of the security system 100. In some implementations, one or more pieces of equipment of the equipment 134 belongs to multiple security sub-systems.

The equipment 134 may include, for example, one or more security panels, sump pumps, smart water valves, smart plugs, thermostats, a smart HVAC system, smoke detectors, CO detectors, energy meters, smart locks, or garage door controllers. One or more pieces of equipment of the equipment 134 may integrate or utilize one or more sensors of the sensors 136. Each piece of the equipment 134 may be considered a security device. One or more pieces of equipment of the equipment 134 may belong to particular security sub-systems of the security system 100. In some implementations, one or more pieces of equipment of the equipment 134 belongs to multiple security sub-systems.

The monitoring system 102 may include one or more computing devices. The monitoring system 102 may also include one or more data storage devices. The monitoring system 102 may, in addition to the control unit 132, communicate with the insurance system 104 over the network 140. The monitoring system 102 may further communicate with a customer device 112 over a wireless connection, such as over the network 140. The monitoring system 102 may further communicate with a dealer device 110 over a wireless connection, such as over the network 140.

The insurance system 104 may include one or more computing devices. The insurance system 104 may also include one or more data storage devices. The insurance system 104 may communicate with the customer device 112 over a wireless connection, such as over the network 140. The insurance system 104 may further communicate with the dealer device 110 over a wireless connection, such as over the network 140.

The network 140 can include public and/or private networks and can include the Internet.

The customer device 112 may be a computing device, such as a laptop computer, a desktop computer, a tablet computer, a mobile telephone, a smartphone, security panel, or a personal digital assistant (PDA). The customer device 112 can communicate with the dealer device 110 over the network 140.

The dealer device 110 may be a computing device, such as a laptop computer, a desktop computer, a tablet computer, a mobile telephone, a smartphone, or a personal digital assistant (PDA).

The disclosed system and related techniques improve the accuracy and increase the efficiency of assessing the risk posed by a customer or potential customer. The disclosed system may determine information regarding a customer's existing security system, planned changes to an existing security system, and/or planned installation of a security system. This customer information may include coverage information (e.g., the security sub-systems, security devices, and/or security software a customer has installed or implemented at a property) and utilization information. The disclosed system may use the coverage information and the utilization information to calculate a coverage score, a utilization score, and an overall risk score for a customer. The disclosed system may provide these scores, and, in some implementations, other accompanying information, to an insurance provider system. The insurance provider system, using this information, may be able to more accurately assess the risk that a customer presents and generate a quote that more accurately reflects the risk presented. In addition, by having the disclosed system provide this information directly to the insurance system instead of having the customer provide the information, the accuracy of scores are increased as the scores are less susceptible to human error or intentional error on part of the customer. In addition, the customer information used to calculate the scores may be immediately ascertainable from a stored customer profile that is updated over time. As such, the information used to calculate the scores can be quickly accessed, and the scores can be quickly calculated and provided to the insurance system, thereby increasing the efficiency of the risk assessment process.

The disclosed system and related techniques also improve occupant safety. The disclosed system and related techniques allows an insurance provider to offer a customer or a potential customer an indication of how much the customer will save or could save by installing a security system, improving a security system, and/or improving their utilization of a security system. Accordingly, the disclosed system and related techniques may improve the customer's safety and the safety of other occupants of the associated property by motivating a customer to install the security system, improve the security system, and/or improve their utilization of the security system. In addition, by providing a customer an indication of their insurance savings proximately with their request for such a quote during the security system installation or purchase process, the disclosed system and related techniques may motivate a customer to spend their offered insurance savings on additional security sub-systems, security devices, and/or security software, thereby improving the security system and the safety afforded to any occupants of the associated property.

As shown in FIG. 1A, a dealer 106 assists a customer 108 in selecting a security package from a list of security packages through an interface 114a of security monitoring app on the customer device 112. The list of security packages includes an Interactive Gold package, a Property Management Security package, a Water Management package, a Connected Clean Air package (security package 116), and a Commercial package. There may be additional packages which the customer 108 can view by scrolling through the interface 114a of the customer device 112. Here, the customer 108 selects the security package 116 ("Connected Clean Air").

A selection of the security package 116 indicates that the security package 116 is to be added to the customer 108's existing security system 100 for the property 130. The security package 116 may include sensors or equipment in addition to the sensors 136 or the equipment 134 of the customer 108's existing security system 100 that are to be added to the sensors 136 or the equipment 134. The security package 116 may include one or more sensors that replace one or more sensors of the sensors 136. The security package 116 may include one or more pieces of equipment that replace one or more pieces of equipment of the equipment 134. The security package 116 may include a software update to the customer 108's existing security system 100 but not necessarily additional or different sensors, or additional or different equipment. The security package 116 may constitute a security sub-system or security software.

In some implementations, the list of security packages shown in the interface 114a may include a list of security packages that the customer 108 does not currently have installed or otherwise implemented in the property 130. In these implementations, the list of security packages may be generated by the monitoring system 102. In generating the list of security packages, the monitoring system 102 may compare all available security packages (or the equipment, sensors, and/or software included in each of the security packages) with the customer 108's coverage information. In generating the list of security packages, the monitoring system 102 may compare all available security packages (or the equipment, sensors, and/or software included in each of the security packages) with a customer profile for the customer 108 stored on the monitoring system 102.

The customer profile may include the customer 108's coverage information and utilization information. For example, the customer profile may include the customer 108's existing security packages, the customer 108's existing software, the equipment 134, the sensors 136, the customer 108's purchase history, and/or the customer 108's usage of the security system 100 which may include the customer 108's usage of equipment 134 and the sensors 136. The monitoring system 102 may use past purchase or installation information associated with the customer 108 in generating the customer profile. The monitoring system 102 may use information collected by or generated by the control unit 132 in generating the customer profile.

In some implementations, the list of security packages shown in the interface 114a may include a list of security packages that the customer 108 is likely to select. In these implementations, determining that the customer 108 is likely to select a specific security package may include analyzing the customer 108's past purchase history (e.g., that may be included in the customer 108's customer profile) in addition to determining the security packages that they already have installed.

In some implementations, the dealer 106 selects the list of security packages through the dealer device 110 to provide to the customer 108. The list of security packages that the dealer 106 selects may include security packages that the customer 108 does not currently have installed or otherwise implemented in the property 130. The list of security packages that the dealer 106 selects may include security packages that the dealer 106 determines that the customer may be interested. The list of security packages that the dealer 106 selects may include one or more security packages suggested for selection by the monitoring system 102. In selecting the list of security packages, the dealer 106 may access the customer profile for the customer 108 to view the customer 108's existing security packages, sensors, equipment, software, and/or purchase history.

In some implementations, instead of being provided a list of security packages or sub-systems to choose from, the customer 108 is provided a list of equipment and/or sensors that they can have installed in the property 130. In these implementations, the list of equipment and/or sensors may be generated through the methods described above with respect to generating a list of security packages. With the list of equipment and/or sensors, the customer 108 can create their own, customized security package.

Once the customer 108 selects the security package 116 through the customer device 112, they are brought to an interface 114b. The interface 114b presents a list of insurance providers from which the customer 108 can request an insurance quote from. The list of insurance providers includes Insurance A, Insurance B, Insurance C, Insurance D, and Insurance E. There may be additional insurance providers which the customer 108 can view by scrolling through the interface 114b of the customer device 112. Here, the customer 108 selects an insurance provider 118 ("Insurance C") from the list of insurance providers.

In some implementations, the customer 108 may select multiple insurance providers to request a quote from. For additional details on selecting multiple insurance providers, please refer to FIG. 2A below.

In some implementations, the customer 108 is asked to select their existing insurance provider. In these implementations, the customer 108 may be subsequently asked to provide login information. The customer 108's insurance provider may be able to verify the identity of the customer 108 through a security token (e.g., security token 126) as will be discussed in more detail below. When using a security token, the customer 108 may still need to provide credential information for the security monitoring app and/or credential information for their existing insurance provider.

By selecting the insurance provider 118, a request 124 is sent from the customer device 112 to the monitoring system 102. In response to receiving the request 124, the monitoring system 102 generates a security token 126. This security token 126 is provided to both the customer device 112 and to the insurance system 104 associated with the insurance provider 118. The insurance system 104 may use the security token 126 to obtain customer information associated with the customer 108 stored in the monitoring system 102. The insurance system 104 may use the security token 126 to obtain a customer's overall risk score 172 by sending a request to the monitoring system 102 along with the security token 126. The insurance system 104 may use the security token 126 to obtain a customer 108's coverage score 158 and utilization score 168 by sending a request to the monitoring system 102 along with the security token 126.

In some implementations, when a connection between the customer 108 and the insurance provider is established (e.g., when the insurance provider receives the security token 126), customer information may be passed from the monitoring system 102 to the insurance system 104 continuously or periodically. For example, the insurance system 104 may obtain customer information associated with the customer 108 from the monitoring system 102 on a regular cadence to dynamically update the customer 108's coverage score 158, utilization score 168, and/or overall risk score 172.

In some implementations, the insurance system 104 can access other customer information, such as the coverage information or utilization information associated with the customer 108. In some implementations, customer information may include additional information stored within a customer profile of the customer 108.

In some implementations, the insurance system 104 may use the customer information to calculate an overall risk score of their own for the customer 108. In these implementations, the insurance system 104 may apply to a specific weight to the customer 108's coverage score 158 and/or utilization score 168 in determining an overall risk score for the customer 108. In these implementations, where the insurance system 104 has access to more detailed customer information, the insurance system 104 may apply weights to each of the factors used in calculating a customer's coverage score 158 and utilization score 168—as will be discussed in more detail below with respect to FIG. 1B—to determine their own coverage score and utilization score for the customer. The insurance system 104 may then use these customized coverage scores and utilization scores to generate an overall risk score for the customer 108.

In some implementations, the insurance system 104 provides parameters for calculating a customer's overall risk score, utilization score, and/or coverage score to the monitoring system 102. The monitoring system 102 may use these parameters when calculating the customer 108's overall risk score 172, utilization score 168, and/or coverage score 158. These parameters may include weight(s) to apply to the utilization score 168 and/or coverage score 158. These parameters may include weight(s) to apply to one or more factors and/or features used to calculate the coverage score 158 and/or utilization score 168. These parameters may include a customized score lookup table for individual features used to calculate the coverage score 158 and/or the utilization score 168. For example, the insurance system 104 may provide the monitoring system 102 a score lookup table for a Water Devices feature used in calculating the coverage score 158. The score lookup table may indicate, for example, that the customer 108 needs at least one water sensor, one sump pump, and one smart water valve installed in the property 130 in order to receive a Water Device feature score of 100%.

Using the customer information associated with the customer 108, the insurance system 104 generates a quote 128 for the customer 108. Here, the quote 128 is first sent by the insurance system 104 to the monitoring system 102. The monitoring system 102 then passes the quote 128 to the customer device 112. The quote 128 is then displayed on the customer device 112 through the interface 114c.

In some implementations, the quote 128 is based solely on the installation of the security package 116. In these implementations, the quote 128 may be an estimated discount or savings for installing the security package 116, or may represent an actual discount or savings for installing the security package 116. In these implementations, the insurance system 104 may be provided access to the customer information of the customer 108 if the customer 108 decides to pursue a policy with the insurance provider 118. In these implementations, the customer 108 may be able to use the security token 126 to later access the quote 128 and/or verify their identity with the insurance provider 118.

Upon receiving the quote 128, the customer 108 selects to save the quote 128 by a text message by selecting the "Text" button 120. In response to selecting the button 120, the customer 108 is presented a text message containing the security token 126 that was generated earlier. The customer 108 can use this security token 126 later to access the quote from the monitoring system 102 and/or from the insurance system 104.

Figure 1B:
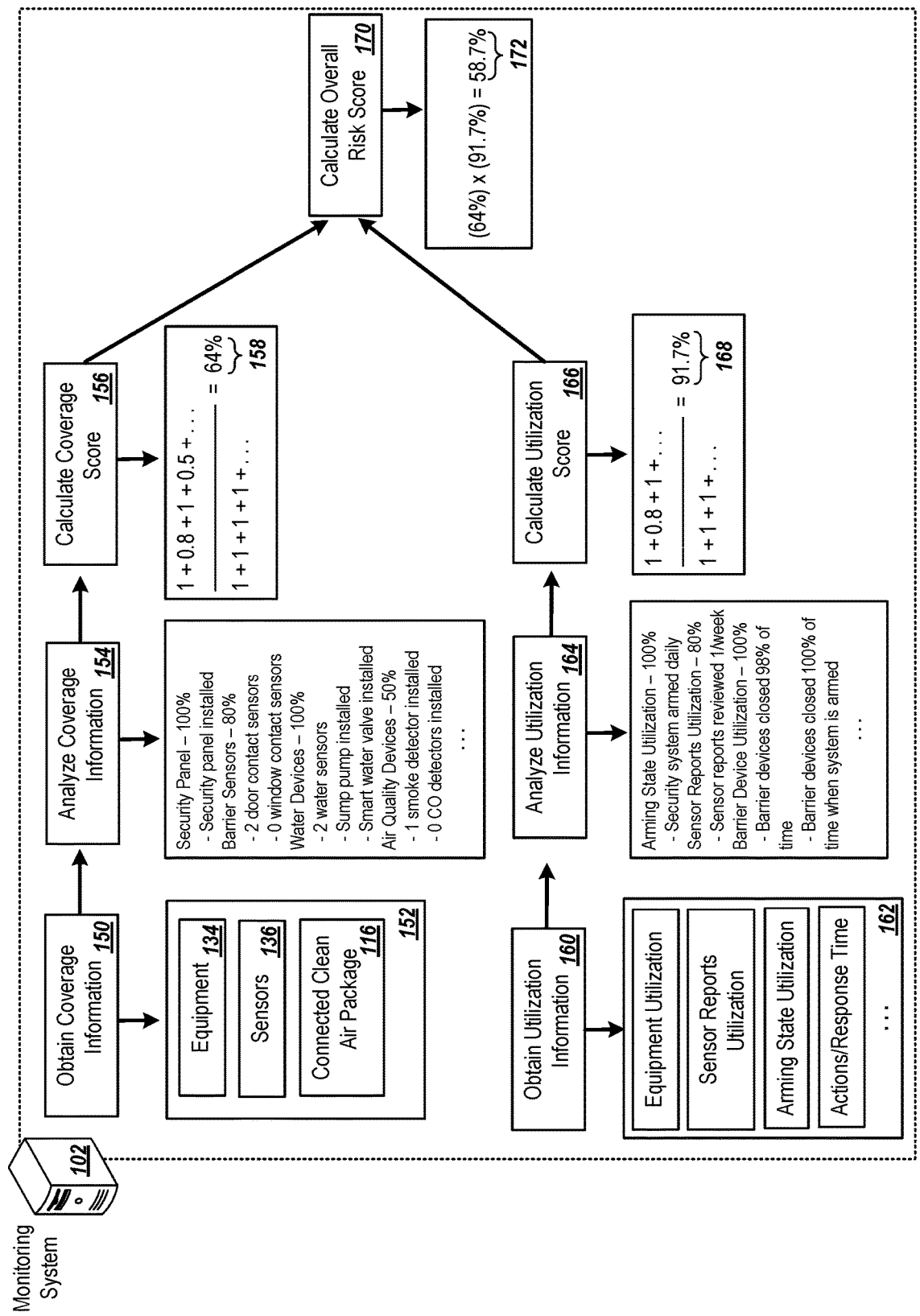

In FIG. 1B, the monitoring system 102 calculates the coverage score 158, the utilization score 168, and an overall risk score 170 for the customer 108 using coverage information 152 and utilization information 162 associated with the customer 108.

As shown, the monitoring system obtains coverage information (150). The coverage information 152 may include the equipment 134, the sensors 136, and the security package 116 that the customer 108 has indicated that they plan to install.

As shown, the monitoring system obtains utilization information (160). The utilization information 162 may include information on the customer 108's utilization of the equipment 134, utilization of sensor reports, utilization of the arming state of the security system 100, response times to security notifications, actions taken in response to security notifications or alarms, etc.

In obtaining the coverage information (150) and the utilization information (160), the monitoring system 102 may use data obtained from the control unit 132 such as sensor and equipment data, the customer 108's purchase history, information provided by the customer 108 through a mobile security app (e.g., as shown in interfaces 114a-114d) of the customer device 112, and/or information provided by a dealer 106 through the dealer device 110.

In general, the coverage information 152 may include an indication of an installed security panel with centralized monitoring, a type of security system installed, a version of the security system installed, a version of the security software installed, barrier sensors installed (e.g., door and/or window magnetic contact sensors), water devices installed and associated software installed (e.g., water sensor(s), smart water valve(s), sump pump(s), leak detection, water detection notifications, leak detection notifications, etc.), a smart HVAC system installed (e.g., an HVAC system which can automatically shut off in cases of CO detection or smoke detection), video-barrier detection devices and associated software installed, barrier equipment and associated software installed (e.g., garage door controller, smart locks, device left open notifications, etc.), air quality devices installed (e.g., smoke detectors or CO detectors), installed equipment age or model, installed sensor age or model, car monitoring devices and associated software installed, boat monitoring devices and associated software installed, other security-related sensors installed, and other security-related equipment installed. Video-barrier detection may include video surveillance through use of one or more video cameras, video-analytics or enhanced video-analytics of recorded video data, 24-hour recording to the cloud, and/or external storage to back-up video data. The coverage information 152 may also include an indication of whether the equipment and sensors were customer installed, or whether those devices were professionally installed.

Here, the customer 108's coverage information 152 may include, for example, the security packages that the customer 108 currently has installed or otherwise implemented, the equipment 134, the sensors 136, and/or the software the customer 108 currently has installed or otherwise implemented. The customer 108's coverage information 152 may also include the security packages, equipment, sensors, and/or software that the customer 108 plans to have installed (e.g., has purchased or is in the process of purchasing) or is scheduled to have installed. The customer 108's coverage information 152 may also include specific information about the equipment 134 and the sensors 136, such as a date of installation, maintenance dates, age of the equipment or sensors, etc. A security package may include one or more security sub-systems, the combination of multiple pieces of equipment, the combination of one or more pieces of equipment and software, the combination of one or more pieces of equipment and one or more sensors, the combination of multiple sensors, and/or the combination of one or more sensors and software. The monitoring system 102 may update the customer 108's coverage information 152 periodically (e.g., every 12 hours, every day, every week, every month, etc.). Alternatively, the monitoring system 102 may update the customer 108's coverage information 152 as new information comes available. For example, if the customer 108 purchases a new security package, the purchase information may be provided to the monitoring system 102 which, in turn, may proximately add an indication of the new security package to the customer 108's coverage information.

In general, the utilization information 162 may include utilization of sensor reports, utilization of barrier devices, utilization of a security system arming state, event detection based on the output of equipment and/or sensors, actions based on security notifications (e.g., a customer's responses and/or response times to notifications associated to an event detection), utilization of an unexpected activity engine, utilization of other equipment, utilization of other sensors, the automated security settings selected by the customer, updates made to the security software, upgrades made to the equipment or the sensors, and maintenance testing of the equipment, the sensors, or any associated software.

Here, the customer 108's utilization information 162 may include, for example, dates and times when the customer 108 has armed the security system 100 for the property 130, the customer's responses to event detection (e.g., always responds, usually responds, sometimes responds, usually does not respond, never responds, etc.), the customer's response times to event detection, utilization of the equipment 134, utilization of the sensors 136, upgrades made to the equipment 134 or the sensors 136, and maintenance testing of the equipment 134, the sensors 136, or any associated software. The monitoring system 102 may update the customer 108's utilization information 162 periodically (e.g., every 12 hours, every day, every week, every month, etc.). Alternatively, the monitoring system 102 may update the customer 108's utilization information 162 as new information comes available, e.g., from the control unit 132. For example, the control unit 132 may notify the monitoring system 102 that a water leak has been detected. In this example, the monitoring system 102 may send a notification to the customer 108 that a water leak has been detected and may track whether the customer 108 responded, the time it took to for the customer 108 to respond if they responded, and/or the response itself (e.g., whether the response was to ignore the water leak, to contact a maintenance personnel, to attempt to stop the leak through use of smart water valves, etc.) if the customer 108 responded. The monitoring system 102 may use this response information to update the customer 108's utilization information.

The monitoring system 102 may use the coverage information 152 of the customer 108 to generate the coverage score 158. In generating the coverage score 158, the monitoring system 102 may analyze the coverage information 152 (154). In analyzing the coverage information 152, the monitoring system 102 may assign a score to each feature in a set of coverage features. These features scores may be a percentage such that 100% represents a perfect or optimal score. These feature scores may be calculated by comparing the coverage information 152 with one or more lookup tables. These one or more lookup tables may be generated by the monitoring system 102. As discussed above, these one or more lookup tables may be provided by the insurance system 104. The monitoring system 102 may calculate a feature score by comparing the customer 108's coverage relevant to a particular feature as indicated by the coverage information 152, determining full coverage possible for the customer 108 (e.g., determining all sensors, equipment, and/or security packages that are relevant to the feature and that are also applicable to the customer 108), and comparing the customer 108's coverage relevant to the particular feature with the full coverage possible for the customer 108. For example, the customer 108 may have a smoke detector installed that is relevant to an air quality feature. In this example, full coverage for the air quality feature that is possible for the customer 108 includes a smoke detector and a carbon monoxide (CO) detector. In this example, the monitoring system 102 may calculate a feature of score of 50% for the air quality feature since the customer 108 has one of two pieces of equipment installed. Alternatively, the monitoring system 102 may access a lookup table for the air quality feature and determine that, based on the customer 108 having a single smoke detector installed and no other relevant equipment, sensors, or security packages, the air quality feature score for the customer 108 should be 50%.

In some implementations, the lookup tables and/or score of a lookup table are dependent on the dependent on the size, layout, and/or type of property that the property 130 is. For example, the lookup table may indicate the customer 108 is not penalized for having only a single smoke detector installed in the property 130 based on, for example, the property 130 having a single floor, the property 130 being smaller than a threshold size (e.g., less than 2,000 sq. ft., less than 1,500 sq. ft., less than 1,000 sq. ft., etc.), and/or the property 130 having less than a threshold number of rooms (e.g., less than four separate rooms, less than three separate rooms, etc.). Similarly, the size, layout, and/or type of property that the property 130 is can be used by the monitoring system 102 in calculating a feature score without a lookup table.

In some implementations, the monitoring system 102 may leverage coverage information from other customers in determining a feature score (and, later, the coverage score 158). The coverage information from other customers (e.g., within a surrounding area) may be used to generate and/or modify lookup tables for the coverage features. As an example, it may be determined for a water device feature that the customer 108 has two water sensors, a sump pump, and a smart water valve installed. In this example, it may be determined that full coverage of the water device feature that is possible for the customer 108 includes three water sensors, a sump pump, and two smart water valves. Despite the customer 108 having less than full coverage, the monitoring system 102 may still calculate a feature score of 100% because the coverage information for other customers within a particular area (e.g., 50 mile radius from the customer 108, 100 mile radius from the customer 108, 200 mile radius from the customer, etc.) indicate that the customer 108 has better coverage than a threshold percentage of other customers (e.g., better than 80% of other customers, better than 85% of other customers, better than 90% of other customers, better than 95% of other customers, etc.).

The coverage score 158 may be an average of scores assigned to each feature of the coverage information 152, e.g., there may be a score assigned to the barrier sensors installed, the water equipment installed, the air quality equipment installed, etc. In some implementations, in calculating the coverage score 158, the monitoring system 102 applies a weight to each feature of the coverage information 152. For example, the score for the installed barrier sensors may be weighed 20% higher than the score for the installed water equipment. In some implementations, the weights assigned to each feature of the coverage information 152 is provided by the insurance system 104. The monitoring system 102 may calculate the coverage score 158 periodically (e.g., every hour, every 6 hours, every 12 hours, every day, every week, every month, etc.). The monitoring system 102 may calculate the coverage score 158 in response to receiving new information associated with the customer 108's coverage. The monitoring system 102 may calculate the coverage score 158 in response to a triggering event.

The monitoring system 102 analyzes the coverage information 152 (154) to determine the coverage feature scores. The monitoring system 102 determines a feature score of 100% for the installed security panel with centralized monitoring due to the customer 108 having such a security panel installed as part of the equipment 134. The monitoring system 102 determines a feature score of 80% for the barrier sensors due to the customer 108 having two magnetic door contact sensors as part of the sensors 136 installed at the back and front doors of the property 130 but not having any magnetic window contact sensors installed. The monitoring system 102 determines a feature score of 100% for the water devices and associated software due to the customer 108 having two water sensors as part the sensors 136, and having a sump pump and a smart water valve as part of the equipment 134. The monitoring system 102 determines a feature score of 50% for the air quality devices due to the customer 108 having a smoke detector (not shown) but not having a CO detector.

The monitoring system 102 may also determine a feature score of 20% for video barrier detection due to the customer 108 having a camera installed as part of the sensors 136 but not having an security packages or software for advanced video-analytics, 24-hour recording to the cloud, or external back-up storage. The monitoring system 102 may also determine a feature score of 60% for the smart HVAC system due to the customer 108 have a smart thermostat (not shown) that shuts off the HVAC system in the presence of smoke. The monitoring system 102 may also determine a feature score of 100% for barrier equipment due to the customer 108 having smart door locks (not shown) despite not having a garage door controller (e.g., the customer 108 may not be penalized for not having a garage door controller due to the property 130 not having any garage doors). The monitoring system 102 may also determine a feature score of 0% for car monitoring due to the customer 108 having a car but not having any car monitoring devices or software installed. The monitoring system 102 may also determine a feature score of 100% for boat monitoring due to the customer 108 not having a boat (or the monitoring system 102 may not assign a score to this feature at all due to the customer 108 not having a boat). The monitoring system 102 may also determine a feature score of 30% for the device installation due to the customer 108 having installed most of the equipment of the equipment 134 and most of the sensors of the sensors 136 himself instead of having them professionally installed.

As previously mentioned, in calculating a coverage score 158 (156), the monitoring system 102 may or may not apply a weight to each of the calculated feature scores. Here, the monitoring system 102 does not apply a weight and determines a coverage score 158 of 64% for the customer 108 by averaging the feature scores. In some implementations, the monitoring system 102 may choose to ignore feature scores where the customer received a score of 100% solely due to not having an item (e.g., a garage door, a boat, etc.) required to otherwise calculate the score. In these implementations, the customer 108's coverage score 158 would be recalculated to 60%. This score of 60% reflects the average of the feature scores after removing the feature score of 100% for boat monitoring from the calculations.

The monitoring system 102 may obtain utilization information 162 of the customer 108 (160) in order to generate a utilization score 168. In generating the utilization score 168, the monitoring system 102 may analyze the utilization information 162 (164). In analyzing the utilization information 162, the monitoring system 102 may assign a score to each feature in a set of utilization features. These features scores may be a percentage such that 100% represents a perfect or optimal score. These feature scores may be calculated by comparing the utilization information 162 with one or more lookup tables. These one or more lookup tables may be generated by the monitoring system 102. As discussed above, these one or more lookup tables may be provided by the insurance system 104. The monitoring system 102 may calculate a feature score by comparing the customer 108's utilization relevant to a particular feature as indicated by the utilization information 162, determining perfect or optimal utilization possible for the customer 108, and comparing the customer 108's utilization relevant to the particular feature with the perfect or optimal utilization possible for the customer 108. The utilization score 168 may be an average of features scores assigned to each of the utilization features.

In some implementations, the lookup tables and/or score of a lookup table are dependent on the dependent on the size, layout, and/or type of property that the property 130 is. Similarly, the size, layout, and/or type of property that the property 130 is can be used by the monitoring system 102 in calculating a feature score without a lookup table.

In some implementations, the monitoring system 102 may leverage utilization information from other customers in determining a feature score (and, later, the utilization score 168). The utilization information from other customers (e.g., within a surrounding area) may be used to generate and/or modify lookup tables for the utilization features. As an example, it may be determined that the customer 108 arms the security system 100 daily. In this example, it may be determined that perfect or optimal utilization of the security system 100's arming state is for the customer 108 to arm the security system 100 every time that he leaves the property 130 and when he goes to sleep. The customer 108 usually leaves the property 130 twice daily. Accordingly, the monitoring system 102 may determine that the perfect or optimal utilization of the security system 100's arming state that is possible for the customer 108 is to arm the security system 100 three times per day. However, despite the customer 108 utilizes the security system 100's arming state less than perfect or optimal utilization that is possible for the customer 108, the monitoring system 102 may still calculate a feature score of 100% because the utilization information for other customers within a particular area (e.g., 50 mile radius from the customer 108, 100 mile radius from the customer 108, 200 mile radius from the customer, etc.) indicate that the customer 108 has utilizes his security system 100's arming state more often than a threshold percentage of other customers (e.g., more often than 80% of other customers, more often than 85% of other customers, more often than 90% of other customers, more often than 95% of other customers, etc.).

In some implementations, in calculating the utilization score 168, the monitoring system 102 applies a weight to each feature of the utilization information 162. For example, the score for the utilization of barrier devices may be weighed 30% higher than the score for the utilization of sensor reports. In some implementations, the weights assigned to each feature of the utilization information 162 is provided by the insurance system 104. The monitoring system 102 may calculate the utilization score 168 periodically (e.g., every hour, every 6 hours, every 12 hours, every day, every week, every month, etc.). The monitoring system 102 may calculate the utilization score 168 in response to receiving new information associated with the customer 108's utilization of the security system 100, e.g., receiving data from the control unit 132 indicating that the customer 108 has armed the security system 100 for the property 130 through the security panel. The monitoring system 102 may calculate the utilization score 168 in response to a triggering event.

The monitoring system 102 analyzes the utilization information 162 (164) to determine the utilization feature scores. The monitoring system 102 determines a feature score of 80% for utilization of sensor reports due to the customer 108 reviewing the sensor reports an average of once a week. The monitoring system 102 determines a feature score of 100% for utilization of a security system arming state due to the customer 108 arming the security system 100 daily. The monitoring system 102 determines a feature score of 100% for the utilization of barrier devices due to the customer 108 having the doors, on which the barrier devices (e.g., the magnetic sensors as part of the sensors 136) are installed, closed 98% of time on average and 100% of the time on average when the security system 100 is armed. The 98% average closed time and 100% average closed time when the security system 100 is armed may also meet one or more thresholds. For example, due to the average amount of time that barrier devices are closed is at or above a threshold level of 95% and due to the average amount of time that barrier devices are closed when the security system 100 is armed is at or above a threshold level of 98%, the monitoring system 102 determines a feature score of 100% for the utilization of barrier devices.

The monitoring system 102 may also determine a feature score of 70% for actions based on security notifications due to the customer 108 ignoring 10% of the notifications and taking an average of 30 minutes to respond to the notifications. The monitoring system 102 may also determine a feature score of 100% for utilization of an unexpected activity engine due to the customer 108 using the engine which detected one event in the last month. The monitoring system 102 may also determine a feature score of 100% for maintenance testing due to the customer 108 testing the water shut-off system (e.g., a sub-system comprising the two water sensors of sensors 136, and the sump pump and the smart water valve of the equipment 134) three months ago which was one month before testing was scheduled, and due to the customer 108 testing the front and rear door magnetic sensors of the sensors 136 once in the last week. One or more of the feature scores may be calculated using thresholds.

As discussed above, in calculating a utilization score 168 (166), the monitoring system 102 may or may not apply a weight to each of the calculated feature scores. Here, the monitoring system 102 does not apply a weight and determines a utilization score 168 of 91.7% for the customer 108 by averaging the feature scores.

The monitoring system 102 may use the calculated coverage score 158 and the calculated utilization score 168 to calculate an overall risk score 172 for the customer 108 (170). The monitoring system 102 may multiply the coverage score by the utilization score to obtain an overall risk score 172 of 58.7%. Alternatively, the monitoring system 102 may average the coverage score 158 with the utilization score 168 in order to determine an overall risk score. The monitoring system 102 may apply a weight to both the coverage score 158 and the utilization score 168 prior to calculating the overall risk score 172. In some implementations, the weight to apply to the coverage score 158 and the utilization score 168 is provided by the insurance system 104. The monitoring system 102 may calculate the overall risk score 172 periodically (e.g., every hour, every 6 hours, every 12 hours, every day, every week, every month, etc.). The monitoring system 102 may calculate the overall risk score 172 in response to receiving new information associated with the customer 108's utilization of the security system 100 or the customer 108's coverage. The monitoring system 102 may calculate the overall risk score 172 in response to a triggering event.

In some implementations, the monitoring system 102 does not calculate an overall risk score 172 but rather provides the calculated coverage score 158 and the calculated utilization score 168 to the insurance system 104. In these implementations, the insurance system 104 may use the received coverage score 158 and utilization score 168 in calculating an overall risk score for the customer 108. The insurance system 104 may also use other factors in determining an overall risk score.

In some implementations, the monitoring system 102 does not calculate an overall risk score, a coverage score, or a utilization score for the customer 108 but rather provides the individual feature scores (e.g., calculated during the analysis of the coverage information 152 (154) and the analysis of the utilization information 162 (164)) to the insurance system 104. In these implementations, the insurance system 104 may use the individual feature scores in calculating an overall risk score for the customer 108. In these implementations, the insurance system 104 may use the individual feature scores to calculate a coverage score and a utilization score for the customer 108. The insurance system 104 may use the calculated coverage score and utilization score in calculating an overall risk score for the customer 108. The insurance system 104 may also use other factors in determining an overall risk score.

In some implementations, the sensors 136 may include health monitoring sensors or other health oriented sensors. In these implementations, the quote 128, the customer 108's coverage score 158, the customer 108's utilization score 168, and/or the customer 108's overall risk score 172 may be based, in part, on the health monitoring sensors or other health oriented sensors that the customer 108 has or plans to add, and the customer 108's utilization of those sensors. For example, if the customer 108 has a health insurance policy with the insurance provider 118 for the customer 108's ailing grandmother, the customer 108 may be able to get a reduction in cost for the insurance policy based of the availability and utilization of health sensors around the house. By having the grandmother wear one or more health sensors such as a heart rate monitor and/or a sugar level monitor, the monitoring system 102 can predictively alert a family member, such as the customer 108, and prevent an emergency situation or alleviate the emergency situation. The reduced cost of the insurance policy is more likely to be cost effective for the insurance provider 118 than an emergency situation, or an emergency situation where response was delayed or response was not as quick as it otherwise could have been. Accordingly, for a reduction in health related risk the insurance provider 118 may be motivated to offer a reduced quote to the customer 108.

Figure 2A:
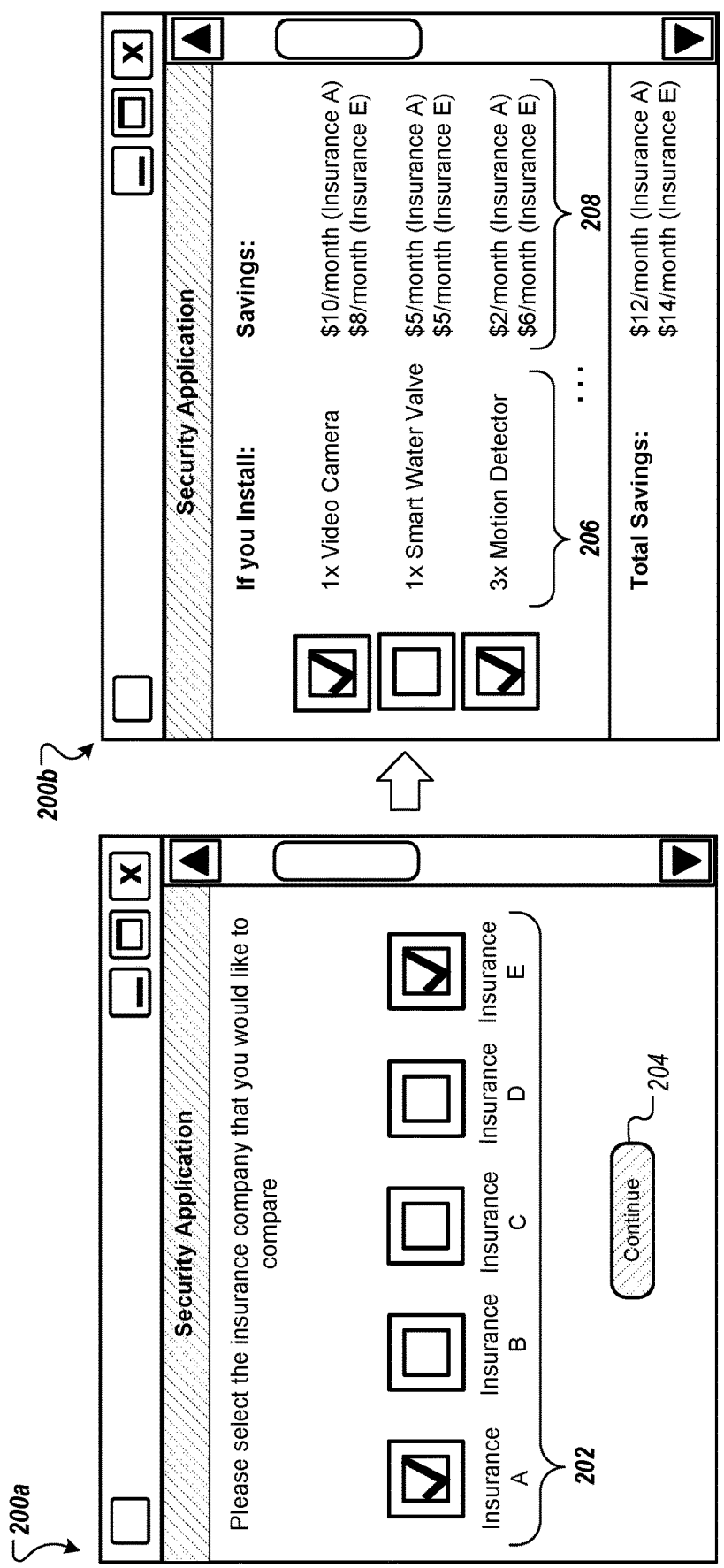
FIGS. 2A-C are diagrams of example interfaces.
Figure 2B:
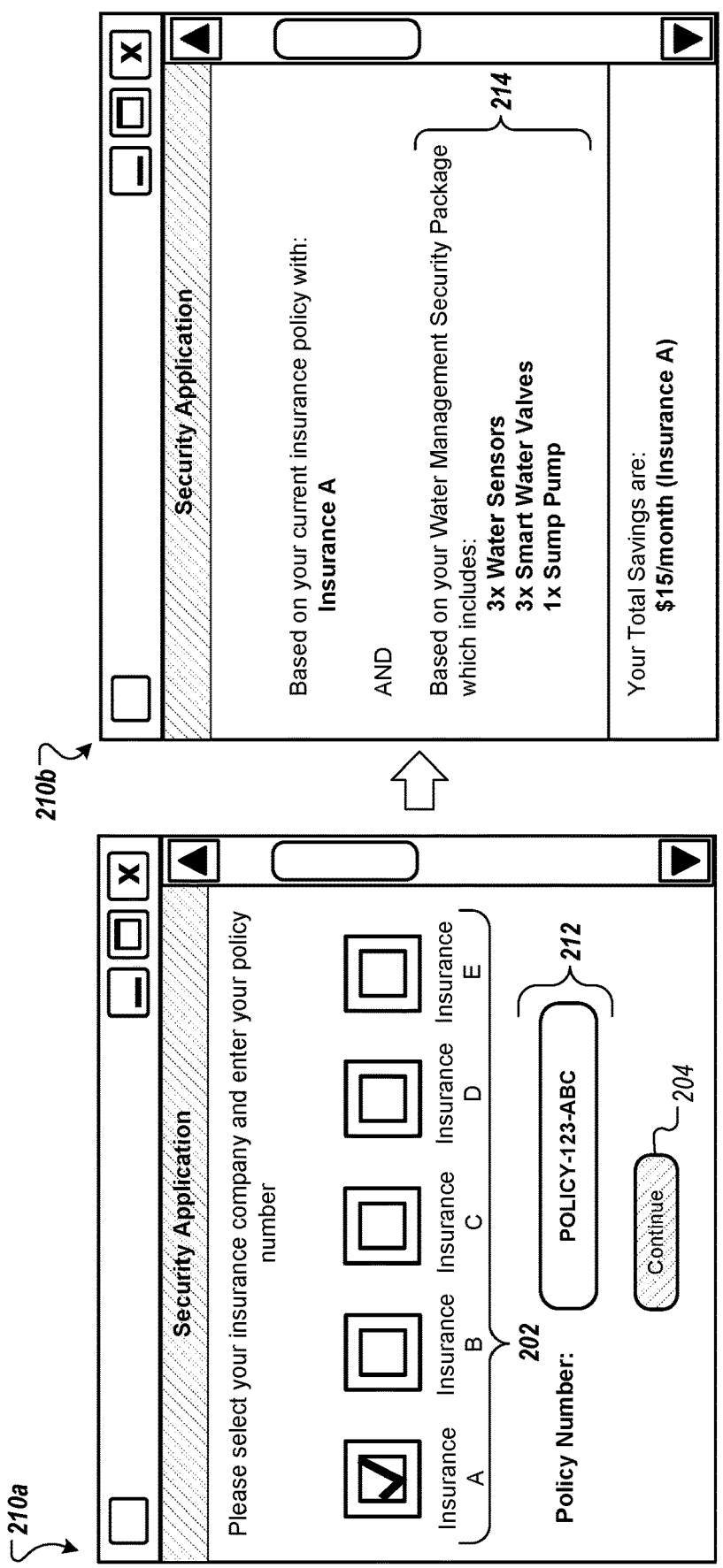
Figure 2C:
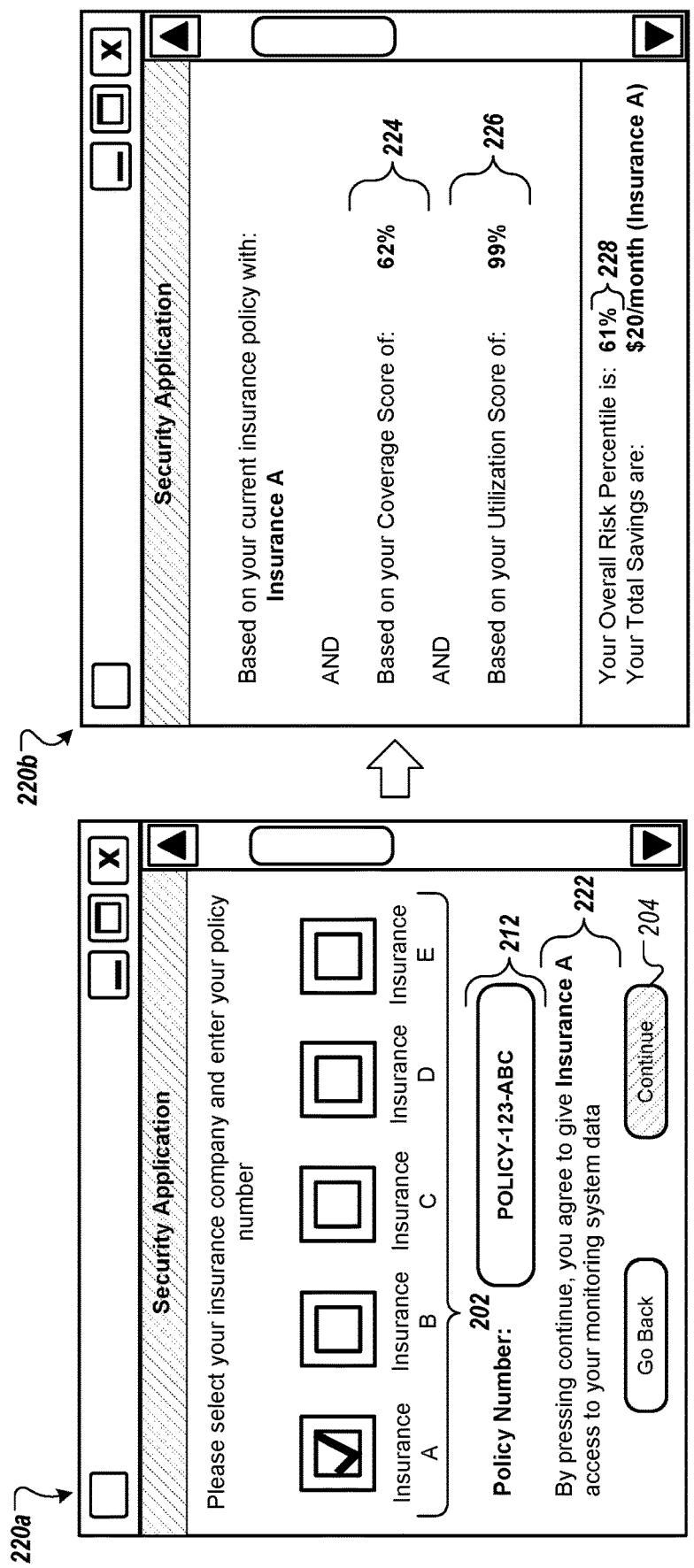

FIGS. 2A through 2C are diagrams of example interfaces that may be displayed on a customer's device 112 or on a dealer's device 110.

As shown in FIG. 2A, the security system 100 may present a customer (e.g., the customer 108 as shown in FIG. 1A) with an interface 200a. The interface 200a includes a list 202 of various insurance providers, Insurances A-E. The security system 100 allows a customer to compare quotes from multiple insurance providers by selecting one or more of the insurance providers in the list 202. Here, a customer has select to compare quotes from both Insurance A and Insurance E.

Upon selection of a "Continue" button 204, the security system 100 brings a customer to the interface 200b. The interface 200b contains a list 206 of sensors and/or equipment on the left side of the interface 200b and a list 208 of quotes/savings associated with each sensor and/or piece of equipment. The list 206 may represent the sensors and/or equipment that are part of a security package. The list 208 may contain a quote for each selected insurance provider for each sensor and/or piece of equipment. Each sensor and/or piece of equipment in the list 206 may be associated with a quantity. This quantity may be fixed, e.g., where the list 206 represents the components of a security package. In some implementations, this quantity can be changed, e.g., by a customer. A change to a quantity associated with a sensor and/or piece of equipment may result in a change to the associated quote(s) in the list 208.

As shown, a customer has indicated that they plan on installing one video camera and three motion detectors. The installation of the one video camera is associated with a $10/month savings from Insurance A and an $8/month savings from Insurance E. The installation of the three motion detectors is associated with a $2/month savings from Insurance A and a $6/month savings from Insurance E. The security system 100 may add up the total savings for each of the insurance providers based on the customer's selections. Here, the total savings are $12/month for Insurance A AND $14/month for Insurance B.

As shown in FIG. 2B, the security system 100 may present a customer (e.g., the customer 108 as shown in FIG. 1A) with an interface 210a. The interface 210a includes the list 202 of various insurance providers, Insurances A-E. The security system 100 allows a customer to select an insurance provider and get a quote based on their existing insurance policy. Here, a customer selects Insurance A from the list 202 and enters their policy number 212 ("POLICY-123-ABC") for Insurance A.

Upon selection of the "Continue" button 204, the security system 100 brings a customer to the interface 210b. By pressing the button 204, the customer may have given the insurance system (e.g., the insurance system 104 as shown in FIG. 1A) for Insurance A access to some of their coverage information, such as their recently purchased or recently installed security packages, sensors, and/or equipment. The security system 100 may present an indication of the selected insurance ("Insurance A") and the customer's coverage information 214. The coverage information 214 indicates that the customer has a water management security package that they have either installed, purchased, or in the process of purchasing. The coverage information 214 indicates that the water management security package contains three water sensors, three smart water valves, and one sump pump. In some implementations, the security system 100 may also display the customer's utilization information. Here, the security system 100 may only display the customer's coverage information 214 due to the customer having not yet installed the water management security package. The security system 100 may add up the total savings for Insurance A based on the customer's coverage and/or utilization information. Here, the total savings are $15/month.

As shown in FIG. 2C, the security system 100 may present a customer (e.g., the customer 108 as shown in FIG. 1A) with an interface 220a. The interface 220a includes the list 202 of various insurance providers, Insurances A-E. The security system 100 allows a customer to select an insurance provider and get a quote based on their existing insurance policy. Here, a customer selects Insurance A from the list 202 and enters their policy number 212 ("POLICY-123-ABC") for Insurance A.

Prior to selection of the "Continue" button 204, the security system 100 may present the customer with a security warning 222, noting that if the customer selects the button 204 they will be giving Insurance A access to some of their monitoring system data. The monitoring system data accessible by Insurance A may include the customer's coverage information, utilization information, coverage score, utilization score, and/or overall risk score as discussed above with reference to FIGS. 1A-B.

Upon selection of the "Continue" button 204, the security system 100 brings a customer to the interface 220b. By pressing the button 204, the customer may have given the insurance system (e.g., the insurance system 104 as shown in FIG. 1A) for Insurance A access to their coverage information, utilization information, coverage score, utilization score, and/or overall risk score as discussed above with reference to FIGS. 1A-B. The security system 100 may present an indication of the selected insurance ("Insurance A"), the customer's coverage score 224, utilization score 226, and overall risk score 228. Here, the customer has a coverage score of 62%, a utilization score of 99%, and an overall risk score of 61% calculated by multiplying the coverage score 224 with the utilization score 226. Based off of these scores, Insurance A has provided the customer a quote/total savings of $20/month.

Figure 3:
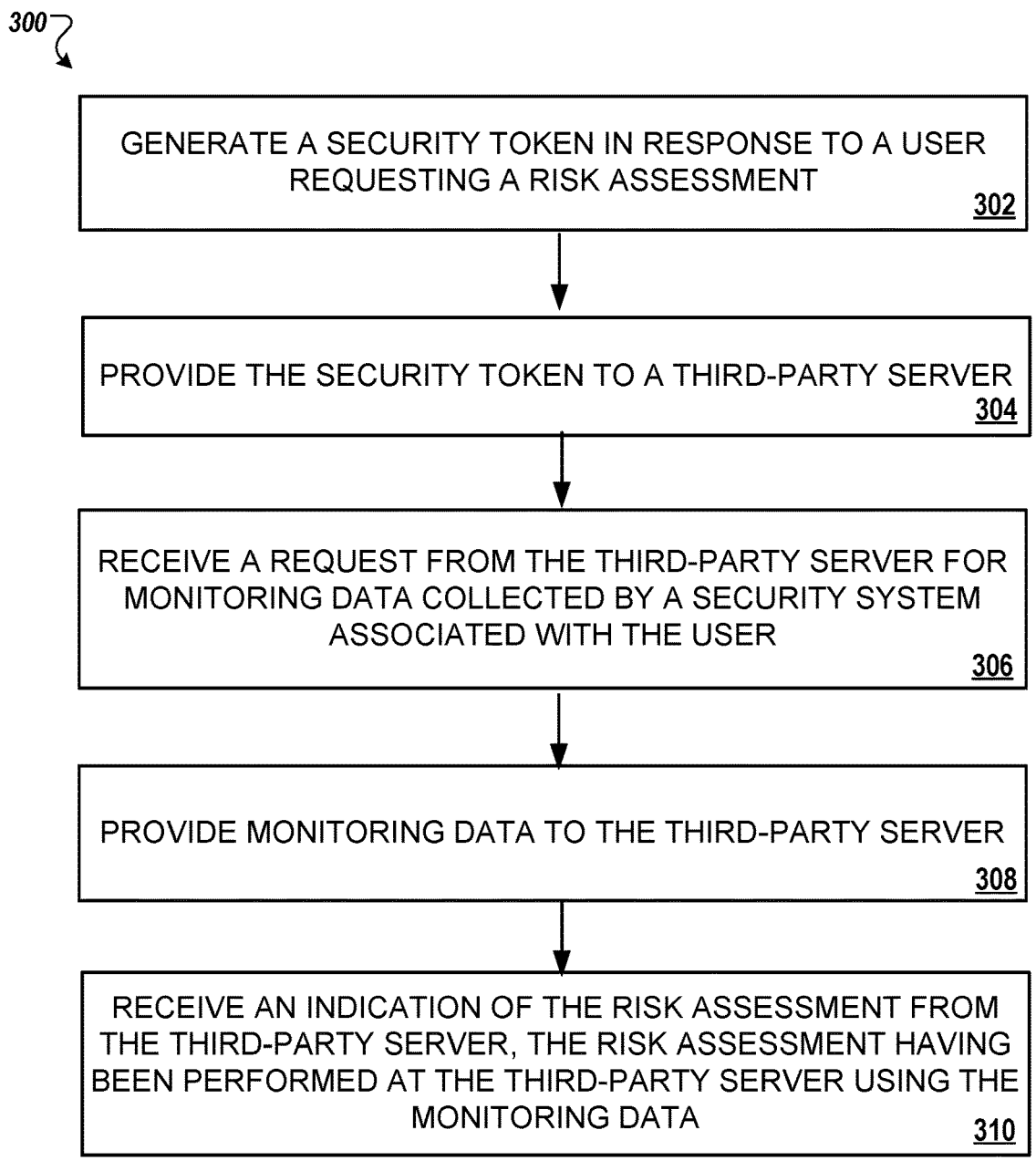
FIG. 3 is a flowchart of an example process for dynamically integrating insurance services with a security system.

FIG. 3 is a flowchart of an example process 300 for dynamically integrating insurance services with a security system. The process 300 can be performed, at least in part, using the security system 100 described herein or the security monitoring system 400 shown in FIG. 4.

The process 300 includes generating a security token in response to a user requesting a risk assessment (302). For example, the security token may be the security token 126 shown in the FIG. 1A. With respect to FIG. 1, the security token 126 may be generated in response to a customer sending a request 124 for a risk assessment from the customer device 112 to the monitoring system 102. The security token 126 may be generated by the monitoring system 102. The monitoring system 102 may provide the security token 126 to the customer device 112 and/or to the insurance system 104.

In some implementations, requesting a risk assessment can include requesting a quote from an insurance provider. For example, with respect to FIG. 2A, a request for a risk assessment can be generated in response to a user selecting the interface element corresponding to the Insurance A and selecting the button 204, thereby indicating that the user wishes to receive a quote from the Insurance A.

The process 300 includes providing the security token to a third-party server (304). The third-party server can be the insurance system 104. The third-party server can be remote with respect to the monitoring system 102 and/or the customer device 112. As an example, with respect to FIGS. 1A-1B, the monitoring system 102 can send the security token 126 to the insurance system 104 over the network 140 as shown in FIG. 1A.

The process 300 includes receiving a request from the third-party server for monitoring data collected by a monitoring system associated with the user (306). The request can include the security token and/or be sent along with the security token. As an example, with respect to FIGS. 1A-1B, the insurance system 104 may request utilization information, coverage information, a utilization score, a coverage score, and/or an overall risk score associated with the customer 108 from the monitoring system 102 as shown in FIGS. 1A-B.

In some implementations, the request from the third-party server for monitoring data may be a request for raw data collected by the monitoring system. For example, with respect to FIG. 1A, a request from the insurance system 104 to the monitoring system 102 may be a request for data collected from and produced by the equipment 134 and the sensors 136. The equipment 134 may include devices and/or sensors of the security system 100. The sensors 136 may include sensors that are included in devices of the security system 100.

The process 300 includes providing monitoring system data to the third-party server (308). The monitoring data can include coverage data and utilization data. Coverage data can reflect the sensors, devices, and/or systems that are already part of the security system, and sensors, devices, and/or systems that are planned to be added to the security system. In some cases, coverage data can reflect the sensors, devices, and/or systems for a new security system that has yet to be installed. Utilization data can reflect the user's use of the sensors, devices, and/or systems that are already part of the security system. In some cases, utilization data can reflect the user's use of sensors, devices, and/or systems of a previous security system and/or a security system that is scheduled for replacement. As an example, with respect to FIGS. 1A-1B, the monitoring system 102 may provide the insurance system 104 with the customer 108's utilization information, coverage information, a utilization score, a coverage score, and/or an overall risk score.

In some implementations, providing monitoring data to the third-party server includes providing an indication of coverage data associated with the user and an indication of utilization data associated with the user to the third-party server. An indication of the coverage data associated with the user can include the coverage score, such as the coverage score 158 shown in FIG. 1B. Similarly, an indication of the utilization data associated with the user can include the utilization score, such as the utilization score 168 shown in FIG. 1B.

Additionally or alternatively, an indication of the coverage data can include an indication of the sensors, devices, and/or systems that are part of the security system. For example, with respect to FIGS. 1A-1B, an indication of the coverage information 152 can include an indication of the equipment 134, the sensors 136, security packages that security system 100 already includes or that are planned to be added to the security system 100 such as the security package 116. Similarly, an indication of the utilization data can include an indication of the utilization of the sensors, devices, and/or systems of the security system. An indication of utilization data can also include an indication of additional behavior of the user, such as response times to events, frequency of opening/reading reports generated by the security system, etc. For example, with respect to FIGS. 1A-1B, an indication of the utilization information 162 can also include an indication of the customer 112's utilization of equipment (e.g., including the utilization of sensors), utilization of sensor reports (e.g., the frequency that sensor reports are opened/read), utilization of the arming state of the security system (e.g., how frequently the customer 108 arms the security system 100), actions/response times for security events (e.g., how quickly the customer 108 responds to security alerts through the customer device 112, such as those indicating a potential break in), etc.

Additionally or alternatively, an indication of the coverage data can include an assessment of the coverage data. For example, with respect to FIGS. 1A-1B, the monitoring system 102 can provide the insurance system 104 its analysis of the coverage information 152 as the indication of the coverage data. Similarly, an indication of the utilization data can include an assessment of the utilization data. For example, with respect to FIGS. 1A-1B, the monitoring system 102 can provide the insurance system 104 its analysis of the utilization information 162.

In some implementations, providing an indication of coverage data associated with the user includes providing, to the third-party server, an indication of at least one of the following: a number of sensors, devices, or systems of the security system associated with the user; types of sensors, devices, or systems of the security system associated with the user; models of sensors, devices, or systems of the security system associated with the user; manufacturers of sensors, devices, or systems of the security system associated with the user; age of sensors, devices, or systems of the security system associated with the user; accuracy of sensors, devices, or systems of the security system associated with the user; and reliability of sensors, devices, or systems of the security system associated with the user. For example, with respect to FIG. 1A, the monitoring system 102 can provide to the insurance system 104 an indication of the types of equipment and sensors included in the equipment 134 and the sensors 136 of the security system 100. The monitoring system 102 can also provide to the insurance system 104 an indication of sensors, devices (e.g., equipment), and/or systems that are planned to be added to the security system 100, such as those sensors/devices/systems that correspond to a security package that the customer 108 has ordered.

In some implementations, providing an indication of utilization data associated with the user includes providing, to the system, an indication of at least one of the following: utilization of at least one sensor associated with the user; utilization of at least one device associated with the user; and utilization of at least one system associated with the user. For example, with respect to FIGS. 1A-1B, an indication of the utilization information 162 associated with the customer 108 can include an indication that the customer 108 arms the security system 100 every day, that the customer 108 opens 80% of sensor reports generated by the security system 100, the customer 108 responds to security alerts in 21.2 seconds on average, etc.

In some implementations, providing the indication of the utilization of the at least one sensor includes providing, to the third-party server, an indication of at least one of the following: frequency that the at least one sensor is in an on-state; frequency that the at least one sensor is collecting sensor data; and frequency that the at least one sensor is synched with the security system associated with the user. For example, with respect to FIGS. 1A-1B, the indication of the utilization of the at least on sensor can include an indication of the percent of time that the sensor is turned on, the percent of time that the sensor is collecting data (e.g., such as when the security system 100 is placed in an armed state), a determination as to whether a particular sensor was actually synched to the security system 100 and/or is providing sensor data to the security system 100, etc.

In some implementations, providing the indication of the utilization of the at least one device includes providing, to the third-party server, an indication of at least one of the following: frequency that the user interacts with the at least one device of the security system associated with the user; frequency that the at least one device is in an on-state such that the at least one device can receive sensor data from one or more sensors of the security system associated with the user or send notifications to the user; and frequency that the user uses the at least one device to arm one or more systems of the security system associated with the user. For example, with respect to FIGS. 1A-1B, the monitoring system 102 can provide an indication of the frequency that the customer 108 is activating a smart lock installed on the front door of the property 130, and/or the frequency that the customer 108 is arming the security system 100 through the smart panel of the equipment 134.

In some implementations, providing the indication of the utilization of the at least one system comprises providing, to the third-party server, an indication of at least one of the following: frequency that the at least one system is in an armed state; frequency that the user reviews security reports generated by the at least one system; frequency that the user interacts with the at least one system; frequency that the user performs an action suggested by the at least one system; response times of the user to acknowledge security events detected by the at least one system; and response times of the user to perform an action suggested by the at least one system. For example, with respect to FIGS. 1A-1B, the monitoring system 102 can provide an indication of the frequency that the customer 108 arms the security system 100 (e.g., arms the security system 100 70% of the time).

In some implementations, the process 300 includes generating a coverage score from the coverage data, and generating a utilization score from the utilization data. Generating a coverage score from the coverage data can include: calculating feature scores for different characteristics of the security system, applying weights to the features scores to generate weighted features scores; and calculating the coverage score using the weighted features scores. The different characteristics of the security system can include individual sensors, devices, or systems that can optionally be included in the security system. Additionally or alternatively, the different characteristics of the security system can include groupings of sensors, devices, or systems that can optionally be included in the security system. The different characteristics of the security system can be defined by an administrator of the third-party server. For example, the insurance system 104 may send the monitoring system 102 definitions of different characteristics of a given security system, and/or algorithms to use to calculate the feature scores. As an example, with respect to FIGS. 1A-1B, coverage characteristics of a security system may correspond to whether the security system includes a security panel, to barrier devices that have been installed as part of the security system or are planned to be added to the security system (e.g., contact sensors, window contact sensors, etc.), to water devices that have been installed as part of the security system or that are planned to be added to the security system (e.g., water sensor(s), sump pump(s), smart water valve(s), etc.), to air quality devices that have been installed as part of the security system or that are planned to be added to the security system, etc.

With respect to FIGS. 1A-1B, generating the feature scores from the coverage data can include comparing the different characteristics with the sensors, devices, and/or systems installed as part of the security system 100 or that are planned to be installed as part of the security system 100. For example, the monitoring system 102 may use the coverage information 152 to generate a feature score of 100% for the coverage characteristic corresponding to the security panel, a feature score of 80% for the coverage characteristic corresponding to barrier sensors, a feature score of 100% for the coverage characteristic corresponding to water devices, and a feature score of 50% for the coverage characteristic corresponding to air quality devices.

In calculating the coverage score from the feature scores, the security system (or the third-party server) may average the feature scores. Alternatively, the security system (or the third-party server) may apply a weight to one or more of the feature scores. The resulting updated features scores may be averaged by the security system (or the third-party server) to generate the coverage score. As an example, as shown in FIG. 1B, the monitoring system 102 has averaged the coverage features scores to determine a coverage score 158 of 64% for the security system 100.

In some cases, the process 300 includes receiving, from the third-party server, an indication of the weights to apply to the feature scores for different characteristics of the security system; and applying the weights to the feature scores to generate weighted features scores. For example, a given insurance company may indicate that a weighting factor of 0.8 should be applied to the feature score corresponding to the barrier sensors and weight of only 0.4 should be applied to the feature score corresponding to air quality control. These weights may be sent to the monitoring system 102 from the insurance system 104. Alternatively, the insurance system 104 may receive the feature scores from the monitoring system 102 and calculate the coverage score using the features scores and the weights.

In some implementations, the process 300 includes generating a utilization score from the utilization data, and generating a utilization score from the utilization data. Generating a utilization score from the utilization data can include: calculating feature scores for different characteristics of the user's use of the security system, applying weights to the features scores to generate weighted features scores; and calculating the utilization score using the weighted features scores. The different characteristics of user's use of the security system can includes the frequency that sensors, devices, and/or systems of the security system are being used at, the frequency that the user is reading sensors reports generated by the security system (or other reports generated by the security system), the frequency that the user arms the security system, the response time for the user to react to security alerts generated by the security system, etc. The different characteristics of the user's use of the security system can be defined by an administrator of the third-party server. For example, the insurance system 104 may send the monitoring system 102 definitions of different utilization characteristics for a given security system, and/or algorithms to use to calculate the utilization feature scores. As an example, with respect to FIGS. 1A-1B, a an algorithm/definition for calculating a utilization feature score for the utilization characteristic of arming state utilization may be received at the monitoring system 102 from the insurance system 104. The algorithm/definition may provide that the customer 108 should receive a feature score of 100% for this utilization characteristic if they arm the security system 100 at least once per day.

With respect to FIGS. 1A-1B, generating the feature scores from the utilization data can include comparing the different utilization characteristics (e.g., ranges of frequency values for different features) with customer 108's actual utilization of various aspects of the security system 100 as provided in the utilization information 162. For example, the monitoring system 102 may use the utilization information 162 to generate a feature score of 100% for the utilization characteristic corresponding to arming state utilization, a feature score of 80% for the utilization characteristic corresponding to sensor reports utilization, a feature score of 100% for the utilization characteristic corresponding to barrier device utilization, and a feature score of 100% for the utilization characteristic corresponding to the frequency of barrier devices being closed.

In calculating the utilization score from the feature scores, the security system (or the third-party server) may average the feature scores. Alternatively, the security system (or the third-party server) may apply a weight to one or more of the feature scores. The resulting updated features scores may be averaged by the security system (or the third-party server) to generate the utilization score. As an example, as shown in FIG. 1B, the monitoring system 102 has averaged the utilization features scores to determine a utilization score 168 of 91.7% for the security system 100.

In some cases, the process 300 includes receiving, from the third-party server, an indication of the weights to apply to the feature scores for different characteristics of the security system; and applying the weights to the feature scores to generate weighted features scores. For example, a given insurance company may indicate that a weighting factor of 0.9 should be applied to the feature score corresponding to the arming state utilization and weight of 0.6 should be applied to the feature score corresponding to barrier device utilization. These weights may be sent to the monitoring system 102 from the insurance system 104. Alternatively, the insurance system 104 may receive the feature scores from the monitoring system 102 and calculate the utilization score using the features scores and the weights.

In some implementations, the process 300 includes generating a risk score from the coverage score and the utilization score. Generating the risk score from the coverage score and the utilization score can include averaging the coverage score and the utilization score, applying a first weight to the coverage score and a second weight to the utilization score that is different than the first weight, and averaging the weighted coverage score and the weighted utilization score, multiplying the coverage score by the utilization score, applying a first weight to the coverage score and a second weight to the utilization score that is different than the first weight, and multiplying the weighted coverage score by the weighted utilization score. For example, with respect to FIGS. 1A-1B, the risk score 172 can be calculated by the monitoring system 102 multiplying the coverage score 158 by the utilization score 168. The weights applied to the coverage score and/or to the utilization score may be provided by the third-party server, e.g., the insurance system 104. These weights may correspond to a specific insurance company.

In some implementations, the third-party server generates the risk score from the coverage score and the utilization score during the performance of the risk assessment. The third-party server may receive the coverage score and the utilization score from the computing device. Alternatively, the third-party server may calculate the coverage score and/or the utilization score from the monitoring data received from the computing device. For example, with respect to FIGS. 1A-1B, the insurance system 104 may calculate a risk score after receiving the coverage score 158 and the utilization score 168 from the monitoring system 102.

In some implementations, performing the risk assessment includes the third-party server determining an initial risk score for the user from the monitoring data, accessing at least one of monitoring data corresponding to one or more other users or risk assessments previously performed for the one or more other users, and determining a risk score for the user by adjusting the initial risk score based on at least one of the monitoring data corresponding to the one or more other users or risk assessments previously performed for the one or more other users. The initial risk score can be based on a coverage score corresponding to the user and a utilization score corresponding to the user. As an example, with respect to FIGS. 1A-1B, the insurance system 104 may request monitoring data, such as coverage scores and utilization scores, from other users that have security systems or that plan to install security systems. The insurance system 104 may use the coverage data from the other users to determine how the security system 100 of the customer 108 compares to the security systems of others. The insurance system 104 may adjust the coverage score 158 for the customer 108 based on the comparison such that the coverage score 158 may be increased if the insurance system 104 determines that the security system 100 is more robust than most the security systems of the other users (e.g., has more sensors/devices, more types of sensors/devices, sensors/devices made by more reputable manufacturers, sensors/devices that are more reliable, newer sensors/devices, etc. when compared to those of the security systems of the other users) and the coverage score 158 may be decreased if the insurance system 104 determines that the security system 100 is less robust than most the security systems of the other users.

Similarly, the insurance system 104 may use the utilization data from the other users to determine how the customer 108's use of the security system 100 compares to the other users' use of their respective security systems. The insurance system 104 may adjust the utilization score 168 for the customer 108 based on the comparison such that the utilization score 168 may be increased if the insurance system 104 determines that the customer 108 generally has higher or more consistent utilization of the security system 100 when compared to the utilization of the security systems of the other users and the utilization score 168 may be decreased if the insurance system 104 determines that the customer 108 generally has lower or less consistent utilization of the security system 100 when compared to the utilization of the security systems of the other users.

The third-party server (e.g., the insurance system 104) may generate an updated risk score using the modified coverage score and the modified utilization score.

In some cases, the other users are those users that are within a threshold distance of the user. For example, with respect to FIGS. 1A-1 B, the insurance system 104 may request monitoring data for those users that reside in properties (e.g., where their respective security systems are installed) that are threshold distance (e.g., 10 miles, 20 miles, 50 miles, etc.) from the customer 108. Additionally or alternatively, the insurance system 104 may request monitoring data from those users that reside in the same region (e.g., town, county, city, or state) as the customer 108, have the same zip code as the customer 108, etc.

In some cases, the other users are randomly selected from a larger group of potential users. For example, with respect to FIGS. 1A-1B, the insurance system 104 may request monitoring data from 100 randomly selected users to compare with the monitoring data of the customer 108. These other users may reside anywhere in the country, for example, or may reside in an area where the security system 100 is installed (e.g., where the property 130 is located).

The process 300 includes receiving an indication of the risk assessment from the third-party server (310). An indication of the risk assessment can include, for example, a risk score generated at the third-party server using a coverage score and a utilization score. An indication of the risk assessment can include, for example, an updated risk score generated at the third-party server from a risk score for the user provided by the computing device. As an example, with respect to FIGS. 1A-1B, the insurance system 104 may average a utilization score with a coverage score, multiply a utilization score with a coverage score, and/or apply a weight to the utilization score and/or coverage score when calculating a risk score for the customer 108 as discussed with reference to FIGS. 1A-B. Alternatively, the monitoring system 102 may calculate a risk score for the customer 108 by averaging a utilization score with a coverage score, multiplying a utilization score with a coverage score, and/or applying a weight to the utilization score and/or coverage score.

In some implementations, the process 300 includes collecting sensor data using one or more sensors or devices. Providing the monitoring data to the third-party server can include providing, to the third-party server, the sensor data or data generated from the sensor data. For example, with respect to FIGS. 1A-1B, the monitoring system 102 can provide to the insurance system 104 the sensor data collected from the sensors 136 and the equipment 134. Additionally or alternatively, the monitoring system 102 can provide to the insurance system 104 an analysis of the sensor data collected from the sensors 136 and the equipment 134.

In some implementations, the process 300 includes receiving a quote from the third-party server. The quote may reflect the risk assessment. The quote may include one or more recommendations for the user to reduce their risk. For example, with respect to FIGS. 1A-1B, the monitoring system 102 receives the quote 128 from the insurance system 104 as shown in FIG. 1A. The monitoring system 102 may compare the received quote with quotes from other insurance providers. The quotes from the other insurance providers may have been previously stored by the monitoring system 102. The quotes from the other insurance providers may be requested by the monitoring system 102 based on the user requesting a quote from the insurance provider. Based on this comparison, the monitoring system 102 may determine the best quote for the user, e.g. the quote that would result in the lowest price for the user or the quote that would save the user the most money.

In some implementations, the process 300 includes sending the quote to the user. For example, the monitoring system 102 sends the quote 128 to the customer device 112 as shown in FIG. 1A. The monitoring system 102 may provide the user with the quote. The monitoring system 102 may provide the user with one or more quotes from other insurance providers. The other quotes selected by the monitoring system 102 based off of a determination that they are lower in price than the quote, that they would save the user more money than the quote, and/or that they are closest in price to the quote.

In some implementations, instead of sending the quote to the user, the process 300 alternatively includes making the quote accessible to the user. In these implementations, the quote may be made accessible to the user through a user facing application or website. For example, with respect to FIG. 1A, the monitoring system 102 may collect one or more quotes from the insurance system 104 and/or other insurance systems and make the one or more quotes accessible to the customer 108 through a website or a customer facing application, such as the security monitoring app displayed in interfaces 114a-114d of the customer device 112. In this example, the customer 108 may access the one or more quotes collected on the monitoring system 102 through their customer device 112. In this example, the website or customer facing application may allow a customer 108 to filter the quotes collected by the monitoring system 102 by different criteria such as, for example, price, brand or company, promotional discounts, etc.

Figure 4:
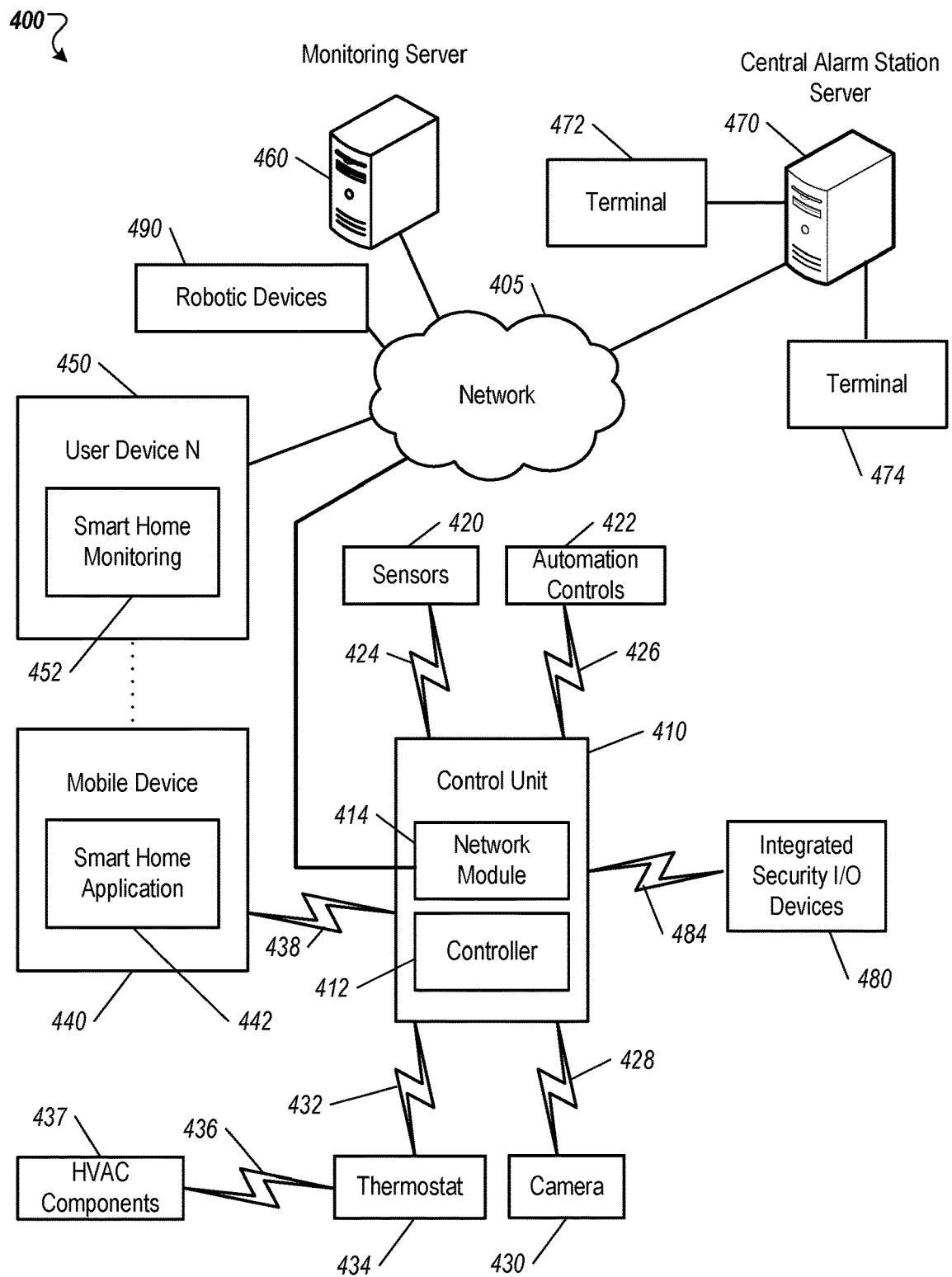
FIG. 4 is a block diagram illustrating an example security monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller 412's power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., customer 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
generating a security token at a computing device in response to a user requesting a risk assessment of a home equipped with a security system;
providing the security token to a third-party system that is remote with respect to the computing device;
receiving, from the third-party system, a request for monitoring data collected by the security system of the home, wherein receiving the request for the monitoring data comprises receiving, from the third-party system, a request that includes the security token;
providing the monitoring data to the third-party system; and
receiving an indication of the risk assessment from the third-party system, the risk assessment having been performed at the third-party system using the monitoring data.

2. The method of claim 1, wherein providing the monitoring data to the third-party system comprises providing an indication of coverage data associated with the user and an indication of utilization data associated with the user to the third-party system.

3. The method of claim 2, wherein providing the indication of coverage data associated with the user comprises providing, to the third-party system, an indication of at least one of the following:
a number of sensors, devices, or systems of the security system associated with the user;
types of sensors, devices, or systems of the security system associated with the user;
models of sensors, devices, or systems of the security system associated with the user;

manufacturers of sensors, devices, or systems of the security system associated with the user;

age of sensors, devices, or systems of the security system associated with the user;

accuracy of sensors, devices, or systems of the security system associated with the user; and reliability of sensors, devices, or systems of the security system associated with the user.

4. The method of claim 2, wherein providing the indication of utilization data associated with the user comprises providing, to the third-party, an indication of at least one of the following:

utilization of at least one sensor associated with the user;

utilization of at least one device associated with the user; and utilization of at least one system associated with the user.

5. The method of claim 4, wherein providing the indication of the utilization of the at least one sensor comprises providing, to the third-party system, an indication of at least one of the following:

frequency that the at least one sensor is in an on-state;

frequency that the at least one sensor is collecting sensor data; and frequency that the at least one sensor is synched with the security system associated with the user.

6. The method of claim 4, wherein providing the indication of the utilization of the at least one device comprises providing, to the third-party system, an indication of at least one of the following:

frequency that the user interacts with the at least one device of the security system associated with the user;

frequency that the at least one device is in an on-state such that the at least one device can receive sensor data from one or more sensors of the security system associated with the user or send notifications to the user; and frequency that the user uses the at least one device to arm one or more systems of the security system associated with the user.

7. The method of claim 4, wherein providing the indication of the utilization of the at least one system comprises providing, to the third-party system, an indication of at least one of the following:

frequency that the at least one system is in an armed state;

frequency that the user reviews security reports generated by the at least one system;

frequency that the user interacts with the at least one system;

frequency that the user performs an action suggested by the at least one system;

response times of the user to acknowledge security events detected by the at least one system; and response times of the user to perform an action suggested by the at least one system.

8. The method of claim 2, comprising:

generating a coverage score from the coverage data; and generating a utilization score from the utilization data.

9. The method of claim 8, wherein generating the coverage score from the coverage data comprises:

calculating feature scores for different characteristics of the security system, wherein the different characteristics of the security system includes at least one of the following:

individual sensors, devices, or systems that can optionally be included in the security system, or groupings of sensors, devices, or systems that can optionally be included in the security system; and calculating the coverage score using the features scores.

10. The method of claim 9, comprises:

receiving, from the third-party system, an indication of weights to apply to the feature scores for the different characteristics of the security system; and applying the weights to the feature scores to generate weighted features scores, wherein calculating the coverage score using the features scores comprises calculating the coverage score using the weighted features scores.

11. The method of claim 8, comprising generating a risk score from the coverage score and the utilization score, wherein providing the monitoring data associated with the user comprises providing the risk score to the third-party system.

12. The method of claim 11, wherein generating the risk score from the coverage score and the utilization score comprises:

averaging the coverage score and the utilization score;

applying a first weight to the coverage score and a second weight to the utilization score that is different than the first weight, and averaging the weighted coverage score and the weighted utilization score;

multiplying the coverage score by the utilization score; or applying a first weight to the coverage score and a second weight to the utilization score that is different than the first weight, and multiplying the weighted coverage score by the weighted utilization score.

13. The method of claim 1, comprising collecting sensor data using one or more sensors or devices, wherein providing the monitoring data to the third-party system comprises providing, to the third-party system, the sensor data or data generated from the sensor data.

14. A method comprising:

receiving, at a server, a security token from a computing device that is remote with respect to the server in response to a user requesting a risk assessment of a home equipped with a security system;

sending, to the computing device, a request for monitoring data collected by the security system of the home, wherein the request comprises the security token;

receiving, from the computing device, monitoring data;

performing the risk assessment using the monitoring data; and providing an indication of the risk assessment to the computing device.

15. The method of claim 14, wherein performing the risk assessment comprises generating a risk score from the monitoring data.

16. The method of claim 14, wherein performing the risk assessment comprises:

determining an initial risk score for the user from the monitoring data, wherein the initial risk score is based on a coverage score corresponding to the user and a utilization score corresponding to the user;

accessing at least one of monitoring data corresponding to one or more other users or risk assessments previously performed for the one or more other users; and determining a risk score for the user by adjusting the initial risk score based on at least one of the monitoring data corresponding to the one or more other users or risk assessments previously performed for the one or more other users.

17. The method of claim 16, wherein determining the risk score for the user by adjusting the initial risk score comprises:

determining the risk score by increasing the initial risk score based on at least one of a determination that the coverage score corresponding to the user is greater than one or more previously determined coverage scores corresponding to the one or more other users, a determination that the utilization score corresponding to the user is greater than one or more previously determined coverage scores corresponding to the one or more other users, and a determination that the initial risk score for the user is greater than one or more previously determined initial risk scores for the one or more other users; or determining the risk score by decreasing the initial risk score based on at least one of a determination that the coverage score corresponding to the user is less than one or more previously determined coverage scores corresponding to the one or more other users, a determination that the utilization score corresponding to the user is less than one or more previously determined coverage scores corresponding to the one or more other users, and a determination that the initial risk score for the user is less than one or more previously determined initial risk scores for the one or more other users.

18. The method of claim 16, wherein accessing at least one of the monitoring data corresponding to the one or more other users or the risk assessments previously performed for the one or more other users comprises accessing at least one of the following:

monitoring data corresponding to one or more other users that correspond to a locality that corresponds to the user, or risk assessments previously performed for one or more other users that correspond to a locality that corresponds to the user.

19. A system comprising:

one or more computers; and one or more computer-readable media storing instructions that, when executed, cause the one or more computers to perform operations comprising:

generating a security token at a computing device in response to a user requesting a risk assessment of a home equipped with a security system;

providing the security token to a third-party system that is remote with respect to the computing device;

receiving, from the third-party system, a request for monitoring data collected by the security system of the home, wherein receiving the request for the monitoring data comprises receiving, from the third-party system, a request that includes the security token;

providing the monitoring data to the third-party system; and receiving an indication of the risk assessment from the third-party system, the risk assessment having been performed at the third-party system using the monitoring data.

20. The method of claim 1, wherein receiving the indication of the risk assessment comprises:

receiving the indication of the risk assessment that was determined using a risk score determined using (i) the monitoring data collected by the security system of the home and (ii) second monitoring data corresponding to one or more other risk assessments previously performed.

* * * * *